US008020618B2

(12) United States Patent
Véronique et al.

(10) Patent No.: US 8,020,618 B2
(45) Date of Patent: Sep. 20, 2011

(54) SOLID GAS MIGRATION CONTROL ADDITIVES BASED ON LATEX POWDERS FOR CEMENTING APPLICATIONS

(75) Inventors: Barlet-Gouedard Véronique, Chatenay Malabry (FR); Ermel Michel, St Lambert des Bois (FR); Daniel Sylvie, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 271 days.

(21) Appl. No.: 11/965,255

(22) Filed: Dec. 27, 2007

(65) Prior Publication Data

US 2008/0156493 A1 Jul. 3, 2008

(30) Foreign Application Priority Data

Dec. 27, 2006 (EP) .................................. 06127196

(51) Int. Cl.
*E21B 33/13* (2006.01)
(52) U.S. Cl. ........................................ 166/293; 166/300
(58) Field of Classification Search ........................ None
See application file for complete search history.

(56) References Cited

U.S. PATENT DOCUMENTS

| 4,537,918 | A | 8/1985 | Parcevaux | |
|---|---|---|---|---|
| 6,171,386 | B1* | 1/2001 | Sabins | 106/724 |
| 2003/0173083 | A1* | 9/2003 | Maberry et al. | 166/292 |
| 2007/0172658 | A1* | 7/2007 | Deruelle et al. | 428/405 |

FOREIGN PATENT DOCUMENTS

| CA | 811755 | 4/1969 |
|---|---|---|
| CA | 2076332 | 2/2007 |
| EP | 0189950 | 8/1986 |
| EP | 1674434 | 6/2006 |
| WO | 03011922 | 2/2003 |

* cited by examiner

*Primary Examiner* — Zakiya W Bates
(74) *Attorney, Agent, or Firm* — David Cate; Robin Nava; Jeffrey Griffin

(57) ABSTRACT

Solid latex powders are employed as additives to control gas migration during the cementation of subterranean wells. Preferably, the latex additives are based on vinyl-acetate or styrene-butadiene based polymers. The additives are particularly useful in low-temperature applications. Methods to prepare cement slurries comprising the latex additives, and methods pertaining to the cementation of subterranean wells are also presented.

11 Claims, 1 Drawing Sheet

SOLID GAS MIGRATION CONTROL ADDITIVES BASED ON LATEX POWDERS FOR CEMENTING APPLICATIONS

CROSS REFERENCE TO RELATED APPLICATIONS

This application claims priority to European patent application EP 06127196.1 filed 27 Dec. 2006.

TECHNICAL FIELD

This invention relates to a gas migration additive used in the cementing of oil, gasp water, geothermal or analogous wells. In particular the invention relates to solid additives based on latex powders.

BACKGROUND ART

Generally cementing a well consists of pumping cement slurry from the surface down the casing so that it then returns to the surface via the annulus between the casing and the borehole. One of the purposes of cementing a well is to isolate the different formation layers traversed by the well to prevent fluid migration between the different geological layers or between the layers and the surface. For safety reason it is also essential to prevent any gas rising through the annulus between the borehole wall and the casing.

When the cement has set, it is impermeable to gas. Because of the hydraulic pressure of the height of the cement column, the injected slurry is also capable of preventing such migration. However, there is a critical phase, between these two states which lasts several hours during which the cement slurry no longer behaves as a liquid but also does not yet behave as an impermeable solid. For this reason the industry has developed a series of additives which are intended to maintain a gas-tight seal during the whole cement setting period.

Fluid loss is an important property to control in cement slurries. Fluid loss occurs when the cement slurry comes into contact with a highly porous or fissured formation. Fluid from the cement slurry will migrate into the formation altering the properties of the slurry. When fluid loss occurs it makes the cement more permeable to gas. Fluid loss control additives are used to prevent or at least limit the fluid loss that may be sustained by the cement slurry during placement and its setting.

Known additives include liquid additives based either on a styrene-butadiene latex or a cross-linked poly(vinyl)alcohol microgel.

U.S. Pat. No. 4,537,918 describes using a liquid styrene/butadiene latex as a gas migration prevention agent. The liquid is added to the cement slurry to control gas channeling in the cement.

U.S. Pat. No. 6,235,809 describes a polymer-based additive for gas migration prevention. The additive comprises a blend of sodium silicate, water, a carrageenan suspending agent, sodium polyacrylate, an AM/AMPS/N-vinyl-N-methyl acetamide terpolymer, a dispersant and a cellulosic water soluble polymer. The additive can be either in a dry or aqueous form. The additive is added to the cement slurry to reduce the occurrence of gas channeling in the cement in light-weight-low density cement compositions. However AMPS based copolymer additives are expensive.

In addition, in locations where the climate is cold, such as Russia, Alaska, and Canada for example, liquid additives are not appropriate. In cold climates the liquid additives are difficult to handle as they become hard and therefore are not as pourable, which can lead to difficulties in proper mixing in the cement slurry.

Therefore the invention proposes a solid gas migration prevention additive comprising a latex powder for cementing wells which can be blended with the dry constituents of the slurry. The additive can be used in low temperature climates.

DISCLOSURE OF THE INVENTION

Accordingly in one aspect of the invention a gas migration prevention additive comprises a solid latex powder. Using the additive in a cement mixture it is possible to reduce the fluid loss, and therefore reduce the gas permeability of the cement when setting.

Preferably the gas migration prevention additive comprises a vinyl acetate based latex powder or the additive comprises a styrene/butadiene based latex powder.

Preferably the additive further comprises a polymer. The combination of the latex powder and polymer, decreases the latex powder concentration that needs to be used.

A particularly preferred polymer is an AMPS/AM copolymer. In the following specification, AMPS means 2-acrylamido-2-methylpropane sulfonic acid and AM means acrylamide.

A second aspect of the invention comprises a cement slurry comprising a gas migration prevention additive as described above. The additive as a solid can be blended to the cement slurry before the slurry is pumped down a well.

The invention also comprises a method of cementing a well at low temperatures comprising adding a gas migration prevention additive as described above to a cement composition prior to pumping the cement into the well. Preferably the temperature is below 0° C. Having the additive as a solid enables easier handling of the additive at low temperatures.

Another aspect of the invention is a method of preparing a cement slurry for use in cementing wells comprising blending the additive as described above with the other solid constituents of the slurry.

DETAILED DESCRIPTION OF INVENTION INCLUDING EXAMPLES

Producing Latex Powders

Figure 1:
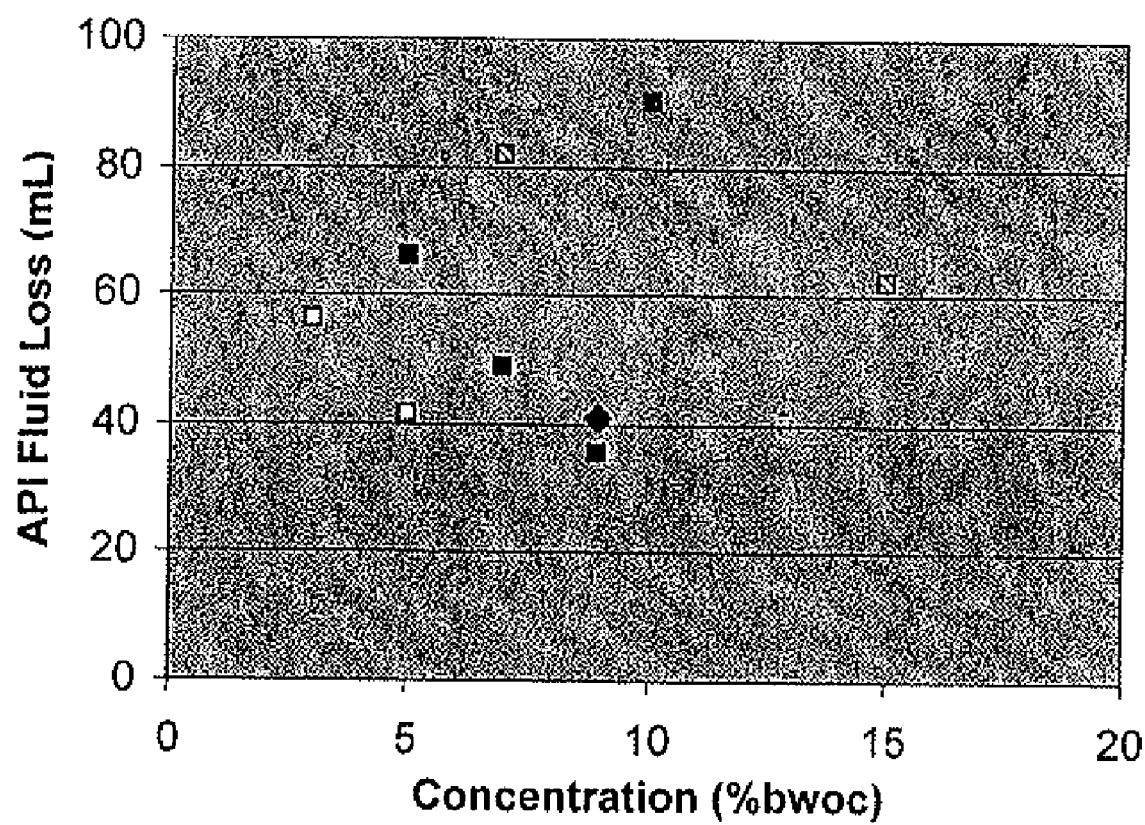
FIG. 1 depicts the fluid loss performances of slurries containing powder and liquid latex additives prepared with freshwater and Dyckerhoff class G cement. □ latex powder at 29° C., ■ latex powder at 85° C. ■ latex powder at 100° C., ▨ latex powder at 120° C., and ♦ liquid latex at 85° C.

The latex powders can be obtained by methods such as spray drying. U.S. Pat. No. 3,058,520 describes the preparation of vinyl acetate latex and U.S. Pat. Nos. 453,791 and 4,151,150 describe styrene-butadiene latex aqueous preparations.

EXAMPLE 1

Performance of Vinyl Acetate Latex Powder

A vinyl acetate based latex powder is tested at 29, 85, 100 and 120° C. [68, 185, 212 and 248° F.] (see FIG. 1). The SVF (solid volume fraction) is kept constant at 53% (porosity of 47%). Fluid loss data obtained with a styrene/butadiene latex suspension currently used for gas migration prevention is used for comparison purposes. This liquid additive is tested at 2.13 gal/sk, a concentration equivalent to 9% bwoc of solid copolymer particles.

A fluid loss value of less than 50 mL is obtained with 5% bwoc of latex powder at 29° C. (see Table 1) and with 7% bwoc of latex powder at 85° C. (see Table 2). Although higher fluid loss values are obtained at 100 and 120° C., some fluid loss control is achieved at those temperatures (see Table 2). No free water is generated in these systems (see Table 1 & 2).

The latex powder compares well with a styrene/butadiene latex (liquid additive) at 2.13 gal/sk (see Table 3). At this concentration of latex, actually equivalent to 9% bwoc of solid styrene/butadiene copolymer particles, a fluid loss value of 41 mL is achieved at 85° C. At 9% bwoc of latex powder, a fluid loss value of about 36 mL is obtained at 85° C. This result is surprising. The latex powders can contain quite significant amounts of additives that facilitate the drying process and make the powder re-dispersible into water when used in cement slurries. Therefore these extra additives dilute the concentration of polymer that contributes to the fluid loss control. Therefore to achieve the same performances, it would be expected that higher concentrations of latex powder than the liquid version would be needed.

TABLE 1

Performances of vinyl acetate based latex powder at 29° C. in slurries prepared with freshwater and class G cement. The SVF (solid volume fraction) is maintained at 53% (i.e. porosity was maintained at 47%).

|  | T (° C.) | |
| --- | --- | --- |
|  | 29 | 29 |
| Latex powder concentration (% bwoc) | 5 | 3 |
| Slurry density (lb/gal) | 16.84 | 17.22 |
| Pv after conditioning at 29° C. (cP) | 334 | 353 |
| Ty after conditioning at 29° C. (lb/100 ft$^2$) | 15 | 12 |
| 10 min gel at 29° C. | 37 | 47 |
| 1 min stirring at 29° C. | 21 | 29 |
| Free water (mL) | 0 | — |
| API Fluid loss (mL) | 41.2 | 56 |

TABLE 2

Performances of a vinyl acetate based latex powder at 85, 100 and 120° C. in slurries prepared with freshwater and class G cement. The SVF (solid volume fraction) is maintained at 53% (i.e. porosity was maintained at 47%).

|  | T (° C.) | | | | | |
| --- | --- | --- | --- | --- | --- | --- |
|  | 85 | 85 | 85 | 100 | 100 | 120 |
| Latex powder concentration (% bwoc) | 5 | 7 | 9 | 7 | 15 | 10 |
| Slurry density (lb/gal) | 16.82 | 16.45 | 16.12 | 16.42 | 15.26 | 15.97 |
| Pv after conditioning at 85° C. (cP) | 123.6 | 129.4 | 83.4 | 98.4 | — | — |
| Ty after conditioning at 85° C. (lb/100 ft$^2$) | 4.8 | 5 | 3 | 2.3 | — | — |
| 10 min gel at 85° C. | 17 | 9 | 12 | 7 | — | — |
| 1 min stirring at 85° C. | 4 | 4 | 4 | 3 | — | — |
| Free water (mL) | 1 | — | 0 | — | — | — |
| API Fluid loss (mL) | 66 | 48.6 | 35.6 | 82 | 62 | 90* |

*Stirring fluid loss

TABLE 3

Performances of a styrene/butadiene based latex suspension at 85° C. in slurries prepared with freshwater and class G cement. The SVF (solid volume fraction) is maintained at 53% (i.e. porosity was maintained at 47%).

|  | T (° C.) |
| --- | --- |
|  | 85 |
| Additive | Liquid latex |
| Additive concentration (gal/sk) | 2.13 |
| Additive concentration (% bwoc) | 9* |
| Slurry density (lb/gal) | 16.25 |
| Pv after conditioning at 85° C. (cP) | 87.4 |
| Ty after conditioning at 85° C. (lb/100 ft$^2$) | 7.4 |
| 10 min gel at 85° C. | 32 |
| 1 min stirring at 85° C. | 11 |
| Free water (mL) | 0 |
| API Fluid loss (mL) | 41 |

*Equivalent solid particles concentration

EXAMPLE 2

Performance of Styrene Butadiene Latex Powder

A styrene butadiene latex powder is evaluated in cement slurries prepared with freshwater and class G cement at 29, 85 and 120° C. (see Table 4). Good performances are obtained at each temperature in terms of slurry rheology, free water and fluid loss control.

A combination of styrene butadiene latex powder and of an AMPS/AM copolymer used as a fluid loss control agent in cementing applications are evaluated in cement slurries prepared with freshwater and class G cement at 29, 85 and 120° C. (see Table 5). Good performances are obtained in terms of free water and fluid loss control. Zero free water is achieved. The addition of a polymer allows the latex powder concentration to be decreased, on the other hand it increases the slurry rheology.

TABLE 4

Performances of styrene/butadiene latex powder at 29, 85 and 120° C. in cement slurries prepared with freshwater, class G cement and 0.1 gps anti-foaming agent.

|  | Temperature (° C.) | | | | |
| --- | --- | --- | --- | --- | --- |
|  | 29 | 85 | 85 | 85 | 120 |
| Latex powder (% bwoc) | 9 | 9 | 12 | 15 | 15 |
| Dispersant (% bwoc) | 0.2 | 0.175 | 0.25 | 0.3 | 0.3 |
| Retarder (gps) | 0 | 0.02 | 0.02 | 0.02 | 0.02 |
| Slurry density (ppg) | 16.15 | 16.06 | 15.58 | 15.22 | 15.22 |
| Porosity (%) | 47 | 47 | 47 | 47 | 47 |
| SVF (%) | 53 | 53 | 53 | 53 | 53 |
| Rheology after mixing | | | | | |
| Pv (cP) | 73 | 64 | 50 | 42 | 50 |
| Ty (lb/100 ft$^2$) | 6 | 5 | 3 | 3 | 2.5 |
| API Rheology | | | | | |
| Pv (cP) | 101 | 85 | 72 | 72 | 54 |
| Ty (lb/100 ft$^2$) | 33 | 22 | 8 | 5 | 3 |
| 10 min gel | 35 | 42 | 19 | 35 | 28 |
| 1 min stirring | 22 | 18 | 9 | 10 | 5 |
| Free water (mL) at 2 h | 0.5 | 1 | — | 0 | 2.5 |
| API fluid loss (mL) | 27 | 102 | 61 | 26 | 40 SFL |
| Volume (mL) | 13.5 | 33.7 | 30.5 | 13 | 20 |
| Duration (min) | 30 | 13 | 30 | 30 | 30 |

TABLE 5

Performances of styrene/butadiene latex powder and a polymer blends at 29, 85 and 120° C. in cement slurries prepared with freshwater, class G cement and 0.1 gps anti-foaming agent.

|  | Temperature (° C.) | | |
| --- | --- | --- | --- |
|  | 29 | 85 | 120 |
| Latex powder (% bwoc) | 4 | 4 | 8 |
| Polymer (% bwoc) | 0.2 | 0.15 | 0.15 |
| Dispersant (% bwoc) | 0.5 | 0.65 | 0.8 |
| Retarder (gps) | 0 | 0.02 | 0.02 |
| Slurry density (ppg) | 17.12 | 17.12 | 16.16 |
| Porosity (%) | 47 | 47 | 47 |
| SVF (%) | 53 | 53 | 53 |
| Rheology after mixing | | | |
| Pv (cP) | 192 | 173 | 90 |
| Ty (lb/100 ft$^2$) | 16 | 9 | 7 |
| API Rheology | | | |
| Pv (cP) | 259 | 224 | 150 |
| Ty (lb/100 ft$^2$) | 17 | 31 | 14 |
| 10 min gel | 36 | 70 | 40 |
| 1 min stirring | 20 | 60 | 39 |
| Free water (mL) at 2 h | 0 | 0 | 0 |
| API fluid loss (mL) | 30 | 61 | 40 SFL |
| Volume (mL) | 15 | 25 | 20 |
| Duration (min) | 30 | 20 | 30 |

An advantage of using solid additives over liquid additives is that as they do not contain water the additives do not form a hard mass in cold climates. In addition as liquid additives are diluted larger volumes are required compared to solid additives. Therefore as smaller volumes of the product are needed to be used, this is beneficial in situations where limited space is available for storage, such as on a rig.

The invention claimed is:

1. A method of cementing a well comprising:
   (i) preblending a gas migration prevention additive comprising a dry solid latex powder with other solid constituents of a Portland cement system;
   (ii) preparing a cement slurry by adding water; and
   (iii) pumping the cement slurry into the well.

2. The method according to claim 1 wherein the temperature at the surface of the well is below about 0° C.

3. The method of claim 1, wherein the solid latex powder is a vinyl-acetate latex powder.

4. The method of claim 1, wherein the solid latex powder is a styrene-butadiene latex powder.

5. The method of claim 1, wherein the additive further comprises a polymer.

6. The method of claim 5, wherein the polymer is 2-acrylamido-2-methylpropane sulfonic acid acrylamide copolymer.

7. A method for controlling gas migration in a subterranean well, wherein the temperature at the surface of the well is below about 0° C., comprising:
   (i) preblending a gas migration prevention additive comprising a solid latex powder with other solid constituents of a Portland cement system;
   (ii) preparing a cement slurry by adding water;
   (iii) pumping the slurry into the well; and
   (iv) allowing the slurry to set.

8. The method of claim 7, wherein the solid latex powder is a vinyl-acetate latex powder.

9. The method of claim 7, wherein the solid latex powder is a styrene-butadiene latex powder.

10. The method of claim 7, wherein the additive further comprises a polymer.

11. The method of claim 10, wherein the polymer is 2-acrylamido-2-methylpropane sulfonic acid acrylamide copolymer.

* * * * *

UNITED STATES PATENT AND TRADEMARK OFFICE
CERTIFICATE OF CORRECTION

PATENT NO. : 8,020,618 B2  
APPLICATION NO. : 11/965255  
DATED : September 20, 2011  
INVENTOR(S) : Veronique Barlet-Gouedard, Michel Ermel and Sylvie Daniel Page 1 of 1

It is certified that error appears in the above-identified patent and that said Letters Patent is hereby corrected as shown below:

Title Page, under Item (12), Delete "Véronique et al.," and insert --Barlet-Gouedard--.

Title Page, Item (75) Inventors: Delete

"Barlet-Gouedard Veronique
 Ermel Michel
 Daniel Sylvie"

and insert

--Veronique Barlet-Gouedard
 Michel Ermel
 Sylvie Daniel --.

Signed and Sealed this
Fifteenth Day of May, 2012

David J. Kappos
*Director of the United States Patent and Trademark Office*